Patented July 25, 1939

2,167,168

UNITED STATES PATENT OFFICE 2,167,168

PREPARATION OF ACETOACETIC ESTERS OF ALIPHATIC ALCOHOLS

Albert B. Boese, Jr., Pittsburgh, Pa., assignor to Carbide and Carbon Chemicals Corporation, a corporation of New York No Drawing. Application July 17, 1936, Serial No. 91,113

14 Claims. (Cl. 260—483)

The present invention relates to the production of acetoacetic esters of aliphatic hydroxy compounds; and more especially it concerns the preparation of alkyl and aralkyl acetoacetates by reacting diketene, preferably in the presence of a catalyst, with a corresponding aliphatic alcohol or a substituted aliphatic alcohol. The reaction conveniently may be conducted in the presence of a volatile solvent for the reactants which is inert thereto, particularly in instances where a solid or a highly-viscous alcohol is employed as a starting material.

In practicing the invention it is preferred to add the diketene slowly with agitation to the alcohol or to a solution of the alcohol in the inert solvent, at the refluxing temperature of the mixture, or at a temperature above around 50° C., but not substantially exceeding 150° C. Among suitable solvents may be mentioned ketones such as acetone and methyl ethyl ketone, aliphatic dialkyl ethers, and hydrocarbons.

The invention is especially adapted for the production of acetoacetates of substituted alcohols, and the higher primary, secondary and tertiary straight-chain and branched-chain, saturated and unsaturated mono-, di- and tri-hydric alcohols; and of the partial (mono- and poly-) acetoacetates of the glycols and polyglycols, the glycol and polyglycol ethers, and glycerol. Relatively high yields of the aceto-acetates are secured, notwithstanding the known ease of decomposition of diketene, especially in the presence of heat. The diketene and selected alcohol preferably are reacted in approximately equimolecular proportions, although an excess of the alcohol or of the diketene may be employed, as see Examples 4 and 10.

Among catalysts found to be particulary efficacious for the preparation of these acetoacetates are the aromatic and aliphatic sulfonic acids; sulfuric acid; and acid salts of inorganic acids, such as sodium acid sulfate.

The following examples will illustrate the invention:

Example 1

To 80 grams of gently refluxing ethylene chlorhydrin containing 0.10 gram of benzene sulfonic acid was added dropwise 42 grams of diketene. When all of the diketene had been added the refluxing was continued for an hour. The solution then was poured into 200 cc. of water. The mixture was extracted with ether, the ether extract was washed with water, and was dried over anhydrous sodium sulfate. When the ether had distilled off, the residue was fractionated under vacuum. The fraction boiling at between 98° to 100° C. under 4 mm. of mercury absolute pressure, consisted of 59 grams of chlorethyl acetoacetate, corresponding to a yield of 72%, based on the diketene employed. It was a colorless, slightly viscous liquid with an ester-like odor, and had a composition apparently corresponding to the formula $CH_3COCH_2COOC_2H_4Cl$.

Example 2

To 90 grams of ethylene glycol monoethyl ether ($\beta$-ethoxy ethanol) containing 0.5 gram of benzene sulfonic acid and heated to 100° C. was added dropwise with agitation 84 grams of diketene. An exothermic reaction occurred, the temperature not being allowed to rise above 110° C. After completion of the reaction, in approximately one hour, the reaction product was washed with a small amount of water, and then was fractionally distilled under vacuum. The fraction distilling at between 93° and 94° C. under an absolute pressure of 3 mm. of mercury consisted of the acetoacetate of ethoxyethyl alcohol, $C_2H_5OC_2H_4OCOCH_2COCH_3$, in the form of a colorless, water-insoluble liquid having an ester-like odor. A yield thereof of 75% was secured.

Example 3

To a solution of 68.5 grams of phenyl ethanolamine in 75 cc. of refluxing benzene was added dropwise 42 grams of diketene. The resulting exothermic reaction was sufficient to keep the solution gently refluxing. Refluxing was continued for two hours after addition of the diketene. The benzene then was distilled off at 100° C. under a vacuum of approximately 100 mm. of mercury, and the residue was dissolved in ether and the solution washed with water to remove the catalyst. The ether solution was extracted with a cold 5% aqueous solution of sodium carbonate. The ether then was distilled from the ether solution under vacuum, leaving a liquid residue of 101 grams of $\beta$-anilino ethyl acetoacetate in the form of a straw-colored viscous liquid, insoluble in water and dilute sodium carbonate, but completely soluble in dilute mineral acid, and in alcohols, ethers, hydrocarbons and other common organic solvents. The product had apparently the structure designated by the formula $CH_3COCH_2COOC_2H_4NHC_6H_5$.

Example 4

To 76 grams of propylene glycol containing 0.1 gram of benzene sulfonic acid was added dropwise with agitation, 42 grams of diketene. During the reaction the temperature was maintained at 100° C., heating being continued for four hours. The reaction mixture was fractionally distilled under vacuum. The fraction boiling at between 130° and 140° C. under an absolute pressure of 2.5 mm. of mercury consisted of propylene glycol monoacetoacetate in the form of 43 grams of a colorless, somewhat viscous, liquid, completely miscible with water.

The residue from the distillation contained 9 grams of propylene glycol diacetoacetate. The catalyst and water-soluble impurities are removed therefrom by dissolving the residue in ether, washing the ether solution with water, extracting the ether solution with cold 5% aqueous solution of sodium carbonate and distilling off the ether under vacuum. The non-distillable propylene glycol diacetoacetate is water-insoluble. The respective mono- and diacetoacetates of propylene glycol apparently have structures corresponding to the respective formulas: $CH_3COCH_2COOCH_2CHOHCH_3$, and $CH_3COCH_2COOCH_2CH(OOCCH_2COCH_3)CH_3$.

Example 5

To 96 grams of anhydrous glycerol containing 0.1 gram of benzene sulfonic acid was added dropwise with agitation 84 grams of diketene. The reaction mixture was maintained at a temperature of 100° C. for three hours by means of a boiling water bath, after which the diketene odor had disappeared.

By extracting the reaction mixture with water, and then extracting the mixture with a cold 5% aqueous solution of sodium carbonate, there is obtained a viscous, straw-colored liquid, insoluble in water, in ether, and in dilute sodium carbonate but completely soluble in alcohol and in acetone. This product is glyceryl diacetoacetate, evidently having a structure corresponding to the formula:

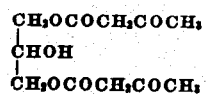

Example 6

To 25.6 grams of 3,9 diethyltridecanol-6 containing 0.05 gram of sulfuric acid was added 8.4 grams of diketene. The solution was heated on a water bath at 100° C. for two hours. The resulting solution was dissolved in ether, washed with a 5% aqueous solution of sodium carbonate, and dried with anhydrous sodium sulfate. The ether then was removed by distillation and the residue was distilled under vacuum. There was obtained an almost quantitative yield of secondary heptadecyl acetoacetate, in the form of a somewhat viscous liquid boiling at between 185° and 195° C., under 3 mm. of mercury absolute pressure, and apparently having a structure corresponding to the formula:

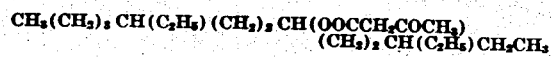

It is insoluble in water and dilute sodium carbonate, but soluble in alcohols, ethers, esters, ketones and aromatic hydrocarbons.

Example 7

Under the conditions described in Example 6, 13 grams of 2 ethyl hexanol-1 containing 0.05 gram of sulfuric acid was reacted with 8.4 grams of diketene, and gave an almost quantitative yield of ethyl hexyl acetoacetate, a liquid boiling at between 120° and 125° C. under an absolute pressure of 4 mm. of mercury. It is soluble in ether, but insoluble in a dilute aqueous solution of sodium carbonate, and has the apparent structure:

The compound may be designated as 2-ethyl hexanacetoacetate-1.

Example 8

Following the procedure described in Example 2, 84 grams of diketene were added dropwise to 102 grams of methylamyl alcohol,

heated to 100° C. and containing 0.5 gram of benzene sulfonic acid as a catalyst. The reaction was completed in about one hour. Upon fractional distillation of the water-washed reaction mixture, an 80% yield of methylamyl acetoacetate,

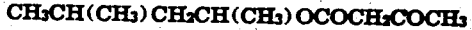

was secured as a fraction boiling between 83° and 84° C. under an absolute pressure of 2mm. of mercury. It is a colorless, water-insoluble liquid having an ester-like odor. This compound may be designated as 4-methyl pentanacetoacetate-2.

Example 9

To 17 grams of anhydrous allyl alcohol containing 0.05 gram of concentrated sulfuric acid were added 25 grams of diketene. After standing at room temperature for two hours, the solution was heated on a water bath at 100° C. for two hours. The reaction mixture was extracted with ether; and the ether solution was washed successively with a 5% aqueous solution of sodium carbonate, and with water, and was then dried over anhydrous sodium sulfate. The ether was removed by distillation; and the residue was fractionally distilled under vacuum. The fraction boiling at between 194° and 195° C. under 737 mm. of mercury absolute pressure, consisted of 38 grams of allyl acetoacetate,

corresponding to a yield of around 91.3%, based upon the allyl alcohol used.

The product is soluble in ether, but is insoluble in dilute aqueous sodium carbonate solution.

Example 10

Ninety grams of diketene were added dropwise during ninety minutes to 88 grams of refluxing tertiary amyl alcohol containing 0.5 gram of benzene sulfonic acid. The reaction was completed in approximately an hour after completion of the addition of the diketene. The reaction mixture then was fractionally distilled under vacuum. Thus were obtained 60.5 grams of tertiary amyl acetoacetate in the form of a fraction boiling at between 82° and 84° C. under an absolute pressure of 4.5 mm. of mercury, representing a yield of around 35.2%, based upon the alcohol used. It apparently has the structure corresponding to the formula

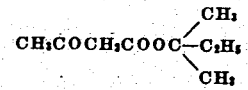

This compound may be designated as 2-ethyl propanacetoacetate-2.

It will be understood that the examples given are intended as illustrative only. Thus, in accordance with the invention, acetoacetates may be produced by reacting diketene with many other hydroxy compounds, such as the various ethylene and propylene glycols and polyglycols; the ethers of the glycols and polyglycols; the halogen hydrin derivatives of the glycols, polyglycols and glycerol; the alkylol amines, and their alkyl and aryl derivatives; glycerol, and the higher monohydric aliphatic alcohols. Among these hydroxy compounds may be mentioned the mono- and dialkyl ethers of ethylene glycol and the polyethylene glycols; glycerol dichlorhydrin; the ethanolamines; 3 ethylheptanol-6; 2 methylnonanol-4; 5 ethylnonanol-2; 3 ethyl-8-methylnonanol-6; 3 ethylundecanol-6; 7 ethyl-2-methylundecanol-4; 3,9 diethylundecanol-6; 9 ethyl-5-methyltridecanol-6; and 5, 11 diethylpentadecanol-8.

It is preferred to use in connection with the isolation and recovery of the acetoacetic esters of the invention, the general procedure described in Example 2, since usually it has been found unnecessary to extract the reaction mixture with ether or other solvent for purification purposes.

The expression "monohydric aliphatic alcohols", as set forth in the claims, is intended to designate primary, secondary and tertiary, straight-chain and branched-chain, saturated and unsaturated monohydric alcohols, which have three or more carbon atoms in their molecules, including the β-alkoxy alkanols such as β-ethoxy ethanol.

I claim:

1. Process for preparing an acetoacetate, which comprises quickly mixing successive small portions of diketene with an aliphatic alcohol having at least three carbon atoms in the molecule, while maintaining the resultant mixture at an elevated temperature not substantially above 150° C., and separately recovering the acetoacetate thus produced.

2. Process for preparing an acetoacetate, which comprises reacting diketene with an organic hydroxy compound selected from the group consisting of the branched-chain monohydric aliphatic alcohols having at least three carbon atoms in the molecule, the said reaction being conducted at an elevated temperature not substantially above 150° C.

3. Process as defined in claim 1, wherein the diketene is added in successive small portions to an agitated body of the said alcohol.

4. Process as defined in claim 1, in which the said reaction is conducted at an elevated temperature within the range from around 50° C. to around 150° C.

5. Process for preparing an acetoacetate, which comprises reacting diketene with an organic hydroxy compound selected from the group consisting of the secondary and tertiary aliphatic alcohols, the said reaction being conducted at an elevated temperature not substantially above 150° C., in the presence of an esterification catalyst.

6. Process of preparing an acetoacetate of a substituted aliphatic alcohol, which comprises slowly introducing successive portions of diketene into a body of the said alcohol, and heating and reacting the same in the presence of an esterification catalyst while agitating the mixture, and while maintaining the reaction mixture at an elevated temperature not substantially above 150° C.

7. Process of preparing an acetoacetate of a monohydric aliphatic alcohol having at least three carbon atoms in its molecule, which comprises heating and reacting successive small portions of diketene with the said alcohol, in the presence of an esterification catalyst, and maintaining the reaction mixture at an elevated temperature not substantially above 150° C.

8. A chemical compound, ethyl hexyl acetoacetate, being a liquid boiling at between 120° and 125° C. under an absolute pressure of 4 mm. of mercury; and being soluble in ether, but insoluble in a dilute aqueous sodium carbonate solution, and having the structure represented by the formula

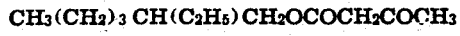

9. A chemical compound, 4-methyl pentan acetoacetate-2, being a water-insoluble liquid boiling between 83° and 84° C. under an absolute pressure of 2 mm. of mercury, and having an ester-like odor.

10. A chemical compound, tertiary amyl acetoacetate, being a liquid boiling at between 82° and 84° C. under an absolute pressure of 4.5 mm. of mercury, and having the structure represented by the formula

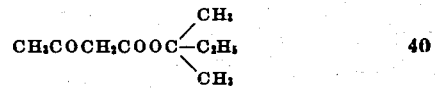

11. Process as defined in claim 1, wherein the diketene is introduced in successive small portions into an agitated solution of the said alcohol in a volatile solvent which is inert to the reactants.

12. The process as defined in claim 1, wherein a sulfonic acid is employed as the catalyst.

13. As a new chemical compound, a branched-chain aliphatic acetoacetic ester, the same being a liquid selected from the group consisting of 2-ethyl hexanacetoacetate-1, 4-methyl pentanacetoacetate-2 and 2-ethyl propanacetoacetate-2.

14. As a new chemical compound, an acetoacetic ester of an organic hydroxy compound selected from the group consisting of the secondary and tertiary aliphatic alcohols.

ALBERT B. BOESE, Jr.